United States Patent [19]

Narabayashi et al.

[11] Patent Number: 5,262,091

[45] Date of Patent: Nov. 16, 1993

[54] STEAM INJECTOR SYSTEM

[75] Inventors: Tadashi Narabayashi, Yokohama; Hiroshi Miyano, Kamakura; Osamu Ozaki, Tokyo; Wataru Mizumachi, Yokohama; Akira Tanabe, Tokyo; Akio Shioiri, Yokohama; Hiroshi Tonegawa, Omiya; Takenori Ishiyama, Kawasaki, all of Japan

[73] Assignee: Kabushiki Kaisha Toshiba, Kawasaki, Japan

[21] Appl. No.: 886,189

[22] Filed: May 21, 1992

[30] Foreign Application Priority Data

| | | | |
|---|---|---|---|
| May 22, 1991 | [JP] | Japan | 3-117187 |
| Aug. 28, 1991 | [JP] | Japan | 3-217267 |
| Sep. 6, 1991 | [JP] | Japan | 3-227018 |

[51] Int. Cl.$^5$ ............................................. B01F 3/04
[52] U.S. Cl. .......................... 261/21; 261/DIG. 13; 261/DIG. 76; 261/DIG. 78; 261/44.2; 261/44.5; 261/23.1; 261/39.1; 417/167; 417/176; 417/184; 376/407
[58] Field of Search ............... 261/DIG. 13, DIG. 76, 261/DIG. 78, 44.2, 44.5, 21, 23.1, 39.1; 376/407; 417/165, 167, 168, 176, 183, 184

[56] References Cited

U.S. PATENT DOCUMENTS

| | | | |
|---|---|---|---|
| 1,653,954 | 12/1927 | Friedmann et al. | 417/183 |
| 2,004,281 | 6/1935 | Henkel et al. | 417/183 |
| 2,296,940 | 9/1942 | Metcalfe et al. | 417/183 |
| 2,340,671 | 2/1944 | Lingenbrink | 417/165 |
| 2,794,447 | 6/1957 | Spitz | 261/DIG. 76 |
| 2,870,865 | 1/1959 | Fenart | 261/23.1 |
| 3,719,524 | 3/1973 | Ripley et al. | 417/183 |
| 4,278,405 | 7/1981 | Angle | 417/176 |
| 4,440,719 | 4/1984 | Howard | 376/407 |
| 4,464,309 | 8/1984 | Lindhardt | 261/23.1 |
| 4,580,948 | 4/1986 | Schmidlin | |
| 5,082,620 | 1/1992 | Fennern | 376/407 |

FOREIGN PATENT DOCUMENTS

| | | |
|---|---|---|
| 3005643 | 8/1981 | Fed. Rep. of Germany ... 261/DIG. 76 |
| 63-289300 | 11/1988 | Japan . |

Primary Examiner—Tim Miles
Attorney, Agent, or Firm—Oblon, Spivak, McClelland, Maier & Neustadt

[57] ABSTRACT

A steam injector system comprises a plurality of steam injectors each being provided with with a check valve adapted for water supply, a check valve adapted for steam supply, a check valve adapted for overflow and a check valve adapted for discharge and the respective water check valves, steam check valves, overflow check valves and discharge check valves are connected. In another aspect, a steam injector system comprises a plurality of first to last stage steam injectors arranged in series with each other, the last stage steam injector being provided with a relief valve disposed at a last stage overflow drain port, and a pressure pulsation absorbing device is disposed at least between the last stage overflow drain valve and the relief valve. A steam injector of an improved structure comprises an outer casing, a water nozzle disposed in the casing so as to extend axially therein, a central steam nozzle disposed inside the water nozzle coaxially therewith, a steam-water mixing nozzle disposed on a downstream side of the water nozzle and the central steam nozzle, and a peripheral steam nozzle mounted to the casing at a portion to supply steam from an outside into the steam-water mixing nozzle, wherein the steam is supplied so as to flow inside and outside the water.

14 Claims, 12 Drawing Sheets

F I G. 2
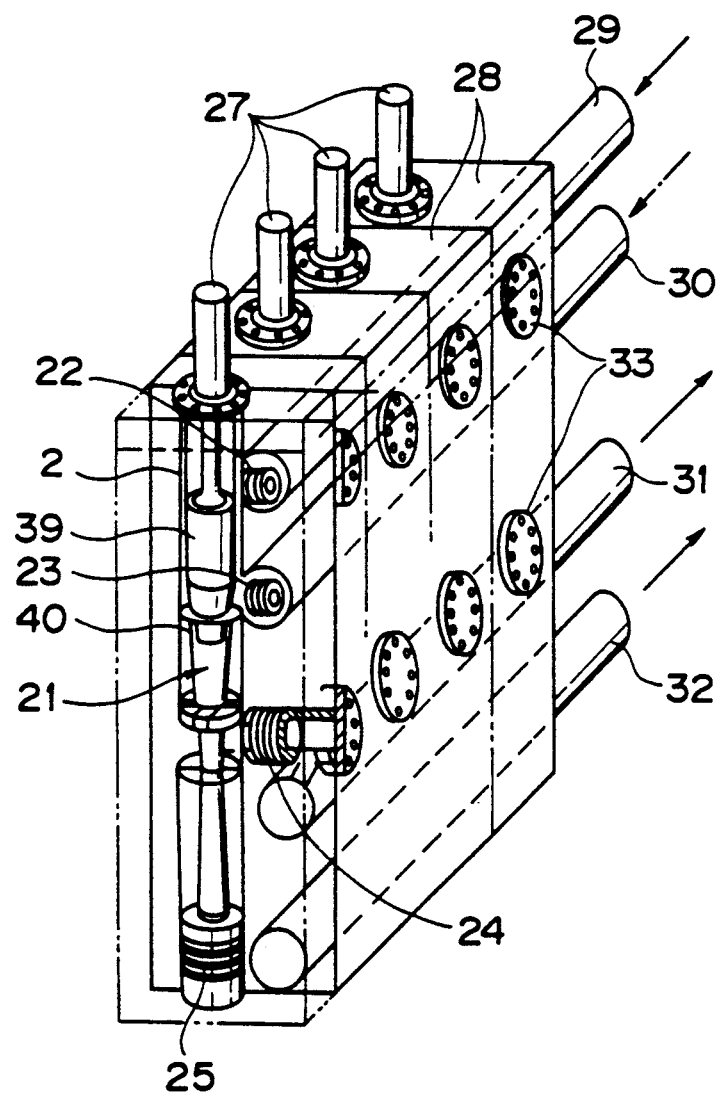

STEAM INJECTOR SYSTEM

BACKGROUND OF THE INVENTION

The present invention relates to a steam injector and a steam injector system adapted for a nuclear reactor or boiler having high large discharging pressure and large capacity to supply water to the reactor or boiler and particularly adapted for a reactor core cooling water supply apparatus operated at an isolation or an emergency of a light water reactor (LWR).

Steam injectors are utilized in prior art for steam locomotives or boilers and, for example, generally have structures shown in FIGS. 11 and 12.

Referring to FIG. 11, reference numeral 2 denotes a casing provided with a steam supply port 1. A steam jet nozzle 4 provided with a needle valve 3 is incorporated in the casing 2, and a water suction port 5 is disposed adjacent to the steam jet nozzle 4. On the downstream side, righthand side as viewed, of the steam jet nozzle 4 are disposed a steam-water mixing nozzle 6 and a pressure increasing diffuser 7, which are communicated with a discharge port 9 through a check valve 8. The steam-water mixing nozzle 6 includes a throat 10 to which is opened an overflow water drain port 12 which is communicated with an overflow water duct 11. The steam injector of such structure may be called "central steam jetting type steam injector".

In the steam injector of the structure described above, when the needle valve 3 is drawn off from the steam jet nozzle 4 by operating a handle 13 secured to the needle valve 3 and the steam supplied from the steam supply port 1 is thereby jetted through the steam jet nozzle 4, the steam is flown into the steam-water mixing nozzle 6 while condensing the steam by a low temperature water sucked through the suction port 5 and having a water temperature lower by about 70° C. than a saturation temperature of the supplied steam. The steam-water mixture is then flown through the throat 10 as high velocity stream.

Referring to FIG. 12, showing another type of steam injector, partially broken away, disposed vertically, the steam injector has a primary liquid inlet nozzle 14 at the central portion of the injector, and a casing 16 having a steam inlet nozzle 15 surrounds the primary inlet nozzle 14. A secondary liquid inlet nozzle 17 is mounted to the side surface of the casing 16 and a diffuser 19 having a lower opened end 18 is also mounted to the casing 16, thereby forming a steam-water mixing chamber 20 below the front end of the primary inlet nozzle 14 and within the steam nozzle 15.

FIG. 13 shows a characteristic analysis model of the steam injector such as shown in FIGS. 11 and 12. The model utilizes an analysis model evidenced by a low pressure visualizing test and adapts a single dimensional steady-state model which is easily analized in its design. Setting conditions are as follows.

(a) Steam flow quantity and flow velocity at the steam nozzle outlet are based on the critical flow theory.

(b) Pressure, temperature and flow velocity at the throat are calculated in accordance with momentum and energy balance of the steam and water between cross sectional areas O and T.

(c) Pressure is increased by the diffuser on the basis of the Bernoulli's theorem.

(d) Experimental values are used for nozzle losses of respective portions.

Further, in FIG. 13, the respective letters or symbols denote as follows: A:area; m:mass flow rate; G: mass velocity (mass flux = m/A); $\rho$:density; u:flow velocity; P:pressure; $\zeta$:loss coefficient; and suffixes S, W, T, D and N represent the supply steam, the suction water, the throat, the diffuser and the nozzle, respectively.

Under the described set conditions, the steam flow rate $m_g$ and the steam flow velocity at the nozzle outlet port $u_{so}$ are obtained in accordance with the critical flow theory. Particularly, it is important that enthalpy of the steam $h_G$ is higher than that $h_L$ of the saturation water by latent heat of vaporization, and an amount corresponding to the difference between these enthalpies heat drop) is converted into kinetic energy of the steam from which loss in the nozzle is subtracted, thereby forming a steam supersonic flow. The suction water is accelerated by this steam supersonic flow from the sectional area 0 to the sectional area T of the main nozzle throat and the steam is condensed therebetween at the suction water surface to form condensed water. During this operation, the kinetic energy of the steam is transferred to the water, thereby forming the high velocity water flow. When the high velocity water flow passes the diffuser for increasing the pressure, an amount of pressure changed from dynamic pressure to static pressure increases on the basis of the Bernoulli's theorem. In the evaluation of the energy transfer amount from the steam supersonic flow to the high speed water flow, it is necessary to estimate the pressure loss in the mixing nozzle and the main nozzle, but this estimation is very difficult, and it is rather easy to obtain the pressure loss by calculating the momentum balance a two inspection surfaces of the sectional areas O and T. Supposing that the steam supersonic flow having the flow rate $u_{so}$ and the suction water having the flow rate $u_{wo}$ are mated with each other at the sectional area 0 and completely mixed and condensed at the sectional area T, a discharge pressure $P_D$ is expressed by the following equation in the adaption of the Beroulli's equation considering the nozzle loss between the throat T and the diffuser outlet port D.

$$P_D = P_o^* + [G_{WO} \cdot A_{WO}/A_T \cdot U_{WO} + G_{SO} \cdot A_{SO}/A_T \cdot U_{SO} - \quad (1)$$
$$G_T U_T] + (1 - \xi_N - \xi_T - \xi_D) \times (\rho_D/2 \cdot U_T^2) - \rho_W/2 \cdot U_{WO}^2 -$$
$$\rho_D/2 U_D^2$$

($P_o^*$: Entire pressure at the sectional area O)

It was confirmed that the discharge pressure $P_D$ calculated by the equation (1) well coincides with the experimental result shown in FIG. 14, and the charactersitic feature of the steam injector is shown in FIG. 14, from which it will be found that a discharge water having a high pressure higher than the pressure of the supply steam can be obtained by a static type mechanism including no movable portion.

In the structures of the steam injector of the prior art, which are partially illustrated in FIGS. 15 and 16, the water jet flow is formed at the central portion of the steam-water mixing nozzle S by the water nozzle W and the steam supersonic flow is formed at an annular portion between the water nozzle W and the steam-water mixing nozzle S. The steam injector of such structure is for example disclosed in the Japanese Patent Laid-open Publication No. 63-289300. According to this structure, the water jet flow is sustained outside by the annular steam supersonic flow and accelerated without contacting the mixing nozzle wall, so that the less amount of the flow motion loss is obtained and the drain pressure is hence increased. However, the evaluation equation of the discharge pressure is expressed by the same equation in the one dimensional steady-flow model and the equation (1) can thus be utilized. The reduction of the flow motion loss is treated with by making small pressure loss coefficient $\zeta_N$ in the mixing nozzle in the equation (1) to a proper value. The steam injector of this structure may be called "outer periphery steam jetting type steam injector" in comparison with the aforementioned type steam injector.

However, in the case of a steam injector adapted for a nuclear power plant in which a large quantity of steam, 15 ton/hr. for example, is injected, there is a tendency of decreasing the discharge pressure by reasons described hereinlater. Furthermore, in such steam injector, it is difficult to secure a large amount of steam source for experiment for developing a large-sized steam injector. For example, in the experiment in which the steam of the amount of 15 ton/hr. is treated with, a large-sized boiler having a power of about 18 MW will be required.

The reason of the tendency of decreasing the discharge pressure in the steam injector of large capacity is explained hereunder with reference to FIGS. 15 and 16, in which FIG. 15 shows the case of a steam injector of small capacity and FIG. 16 shows the case of a steam injector of large capacity. With reference to FIGS. 15 and 16, since the flow rate is increased in proportion to square of the dimension thereof, cross sectional area of the water jet jetted from the water nozzle W is made large in the case of FIG. 16 in comparison with the case of FIG. 15. However, the surface area of the water jet flow F contacting the water and the steam is decided by the sectional area and the length of the water jet flow F. Even if the steam injectors of both the cases are constructed to have similar figures to make square the dimension of the water jet flow of the steam injector of FIG. 16 to that of FIG. 15, it becomes hard to transfer the heat from the surface of the water jet flow contacting the steam to the central portion thereof as the steam injector becomes large. For this reason, the steam condensing efficiency is lowered and the discharge pressure will be hence decreased. As described, as the operation of the steam injector is itself influenced by the heat transfer phenomenon to the central portion from the surface of the water jet flow colliding and condensing, it is difficult to effectively condense the steam to the water as the steam injector becomes large in structure.

Further, in FIGS. 15 and 16, since the flow cross sectional areas $A_w$ at the front ends of the water nozzles W are constant, it is difficult to change the supply water rate to the steam injector, thus providing such problem as that the amount of the water flow drained from the overflow port of the steam injector increases when the discharge flow rate is throttled. As the overflow water cannot be poured in a pressure vessel and must be drained in a suppression pool of drain pit of a reactor, thus being not economical, and accordingly, it is necessary to reduce the amount of the overflow water as small as possible.

Furthermore, in FIGS. 15 and 16, a symbol X represents a closed portion of the critical flow and the steam on the downstream side from this portion X becomes the supersonic flow. In the case of FIG. 15, the area Y represents a portion in which the supersonic flow of the steam accelerates the water jet, and in the case of the small capacity, almost water is accelerated, whereas in the case of FIG. 16, showing the case of the large capacity, the accelerating area of the steam influences on only the surface area of the portion Z.

In the prior art, for the same purpose of increasing the discharge pressure, there is provided a steam injector system in which a plurality of steam injectors are connected in series. In this steam injector system, the water supplied accelerated in a first stage steam injector is further accelerated in a second stage steam injector for achieving high discharge pressure.

However, in such conventional steam injector system in which a plurality of steam injectors are connected in series to obtain the high discharging pressure, when a relief valve disposed at the second stage overflow drain exhaust port is operated, the inner pressure of the second stage steam injector is made instable, providing a significant problem.

SUMMARY OF THE INVENTION

An object of the present invention is to substantially eliminate defects or drawbacks encountered in the prior art and to provide steam injector systems having large capacity adapted to supply water in a reactor core isolation cooling system or emergency core cooling system, for example with reduced mutual interference between steam and water.

Another object of the present invention is to provide steam injector systems capable of achieving high steam condensing efficiency and increased discharge pressure.

A further object of the present invention is to provide steam injector systems capable of stabilizing an inner pressure in the steam injector.

A still further object of the present invention is to provide a steam injector capable of achieving increased discharge pressure and making optimumly variable a steam flow cross sectional area in response to a steam pressure and a required discharge quantity.

These and other objects can be achieved according to the present invention by providing, in one aspect, a steam injector system comprising:

a plurality of steam injectors arranged in parallel with each other, each of the steam injectors being provided with a check valve adapted for water supply, a check valve adapted for steam supply, a check valve adapted for overflow and a check valve adapted for discharge; and a plurality of lines each connecting respective check valves in parallel with each other, the lines including a first line for connecting respective water supply check valves in parallel with each other, a second line connecting respective steam supply check valves in parallel with each other, a third line for connecting respective overflow check valves in parallel with each other, and a fourth line connecting respective discharge check valves in parallel with each other.

According to the steam injector system of the character described above, the water supplied into the steam injector through the water supply line is mixed with the steam supplied into the steam injector through the steam supply line. The pressurized fluid is discharged through a diffuser. In each of such steam injectors are disposed the water supply check valve, the steam supply check valve, the overflow check valve and the discharge check valve, and these check valves are connected in parallel with each other in accordance with their kinds to thereby obtaining high capacity system and highly increased discharge pressure The respective check valves incorporated in the respective connection lines are prevented from being mutually interferenced, thus improving the reliability in the starting and running operations.

In another aspect of the present invention, there is provided a steam injector system comprising:

a plurality of first to last stage steam injectors arranged in series with each other each including a water supply port, a steam supply port, an overflow drain port and a discharge port, the last stage steam injector being provided with a relief valve disposed at a last stage overflow drain port;

a plurality of lines each connecting in series a discharge port of a preceding stage steam injector with a water supply port of a following stage steam injector; and a pulsation absorbing device at least disposed between the last stage overflow drain valve and the relief valve and adapted for absorbing pulsation of pressure of fluid passing the last stage steam injector caused at an operation time of the relief valve.

According to the characters of the steam injector system described above, the pulsation absorbing device is disposed at the overflow drain port at least to the last stage steam injector. Accordingly when the relief valve disposed at the last stage steam injector is operated, the pulsation of the pressure of the fluid passing the last stag steam injector can be suppressed by the pulsation absorbing device whereby the pressure in the steam injector system can be entirely made stable and, hence, the steam injector system can discharge the highly pressurized fluid stably, thus utilizing as water supplying system for a reactor emergency cooling system or the like.

In a further aspect of the present invention, there is provided a steam injector comprising:

an outer casing;

a water nozzle means disposed in the casing so as to extend axially therein;

a water supply means disposed for supplying water to the water nozzle means;

a first steam nozzle means disposed inside the water nozzle means coaxially therewith;

a steam supply means disposed for supplying steam to the first steam nozzle means;

a steam-water mixing nozzle means disposed on a downstream side of the water nozzle means and the first steam nozzle means for mixing water and steam after passing the water nozzle means and the first steam nozzle means;

a second steam nozzle means mounted to the casing at a portion adapted to supply steam from an outside into the steam-water mixing nozzle;

a diffuser means disposed on a downstream side of the steam-water mixing nozzle for increasing a pressure of steam-water mixture; and a discharge means disposed on a downstream side of the diffuser means.

According to the characters of the steam injector described above, in the outer casing, the first central steam is-supplied in the first steam nozzle disposed in the water nozzle coaxially, and the second outer peripheral steam is supplied to the steam-water mixing nozzle at which the first steam is mixed with the water. The pressure of the mixture is increased by the diffuser to obtain the highly pressurized drain. The first and second steams are supplied inside and outside the water jet, thus effectively driving a large quantity of water. In this steam injector, since the flow cross sectional area of the front end of the water nozzle is made variable, the water supply quantity can be optimumly adjusted in accordance with the discharge quantity. Furthermore, the discharge pressure and the overflow temperature may be controlled by arranging the control unit thereby to attenuate the pulsation of the discharge pressure.

In a preferred embodiment, such steam injector can be applied to the aforementioned steam injector systems.

BRIEF DESCRIPTION OF THE DRAWINGS

In the accompanying drawings:

FIG. 2 is a perspective view, partially transparent, of the steam injector system of FIG. 1;

DESCRIPTION OF THE PREFERRED EMBODIMENTS

Figure 1:
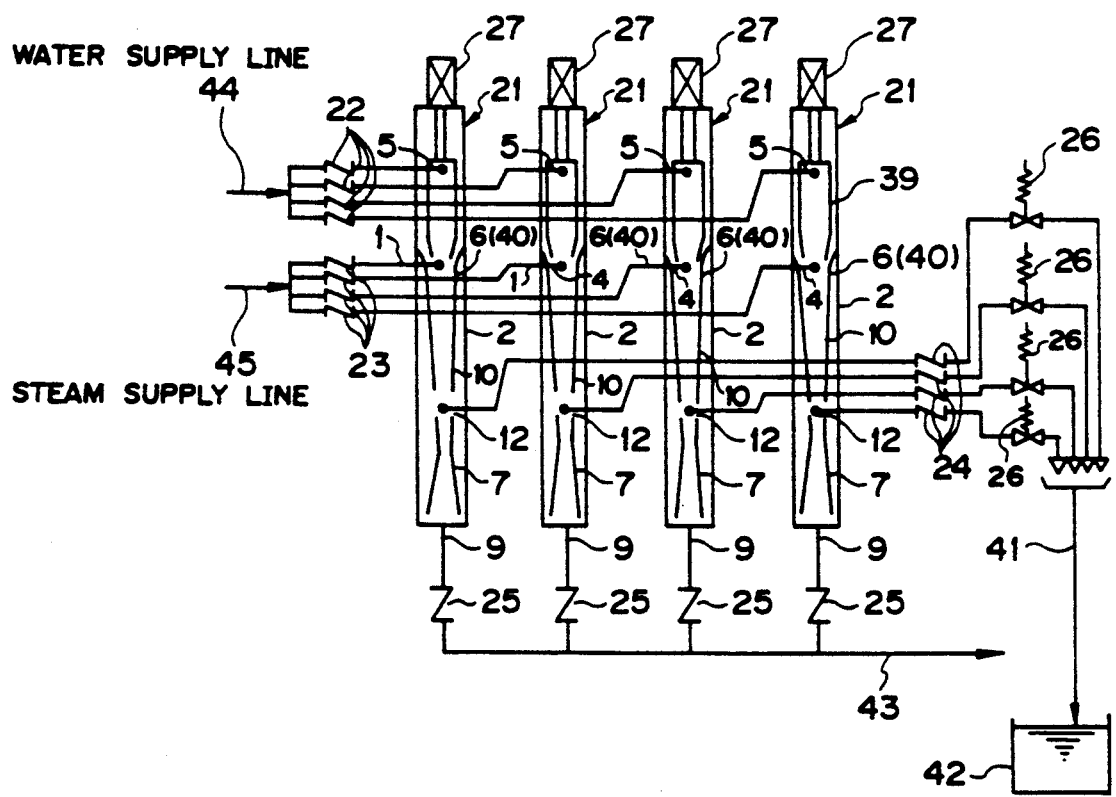
FIG. 1 is a system diagram representing one embodiment of a steam injector system according to the present invention.
Figure 12:
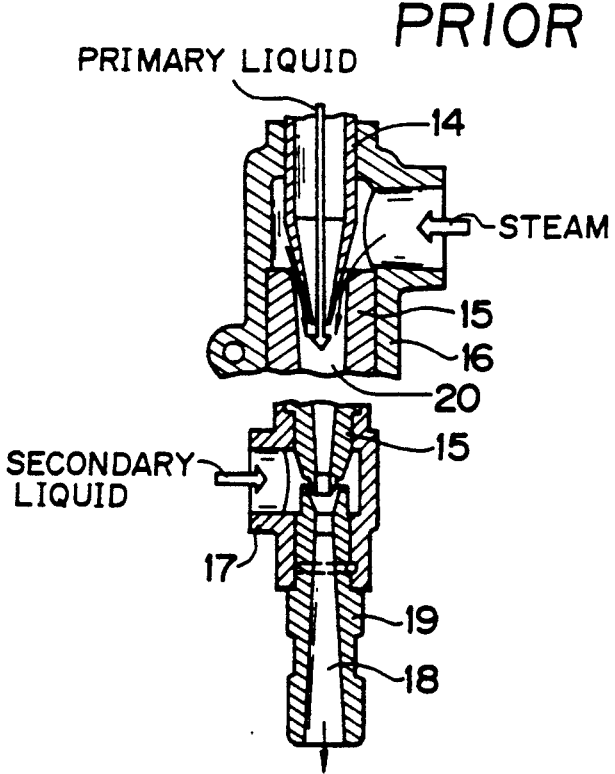
FIG. 12 is an elevational section of another steam injector of conventional structure.
Figure 13:
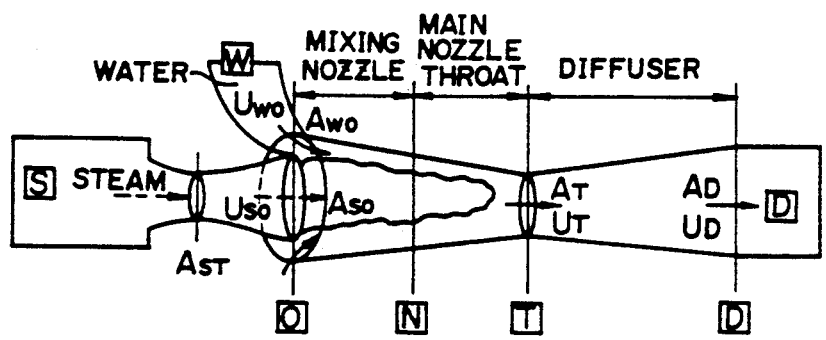
FIG. 13 is a view for the explanatory of operation principle theory of a conventional steam injector.
Figure 14:
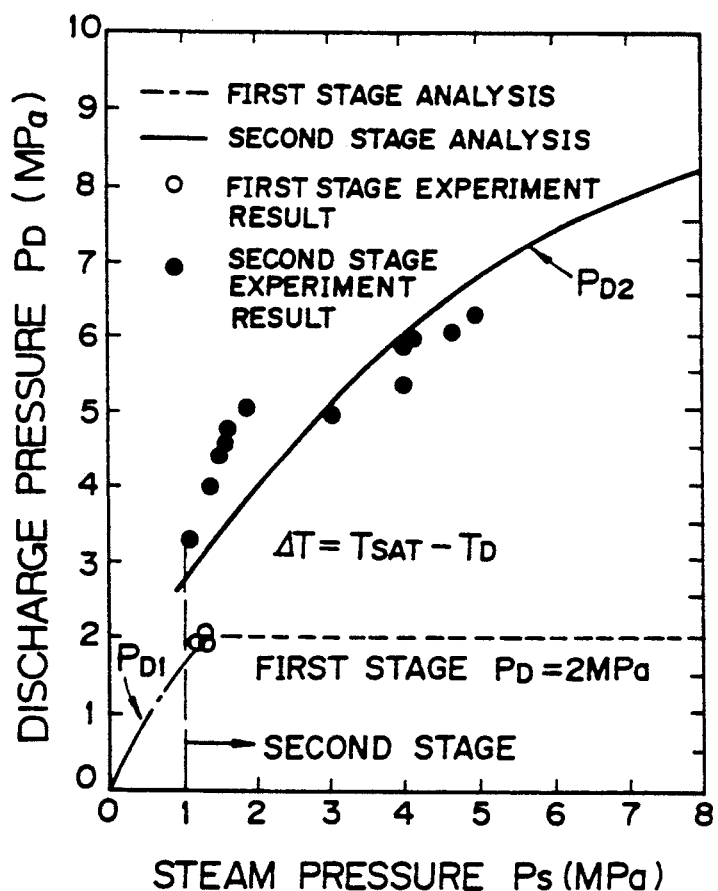
FIG. 14 is a graph showing a relationship between a theoretical analysis and an experimental analysis of the steam injector.
Figure 15:
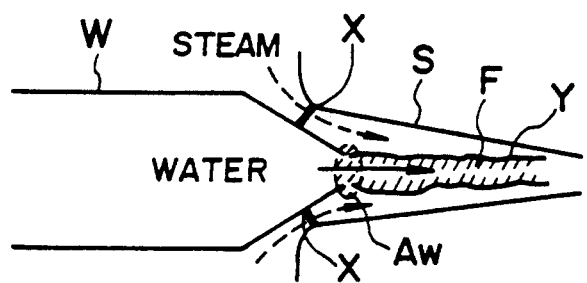
FIGS. 15 and 16 are schematic views for the explanatory of problems of conventional steam injectors having small capacity and large capacity, respectively.
Figure 16:
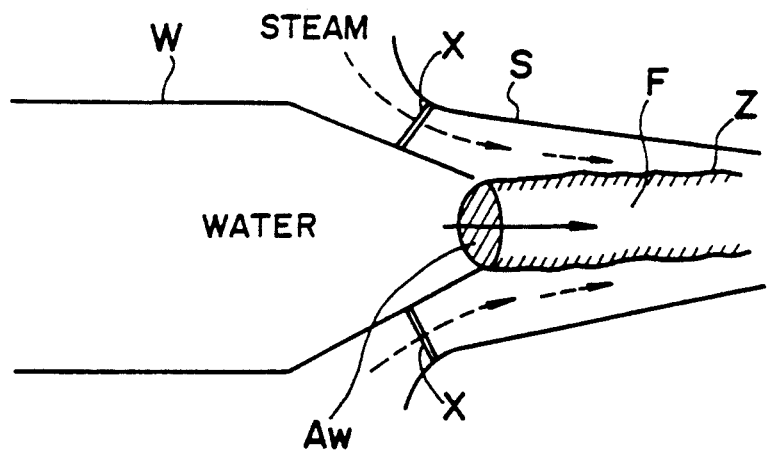

A first embodiment of the present invention will be first described hereunder with reference to a steam injector system of FIGS. 1 and 2, in which FIG. 1 is a diagram of the system for the explanatory of the principle of the first embodiment and FIG. 2 is a perspective view realizing the system of FIG. 1. Referring to FIG. 1 the system includes a plurality, four in the illustration, of steam injectors 21 each having a structure basically corresponding to that of FIG. 12, for example. Namely, each steam injector 21 includes, in a casing, a needle valve, a steam jet nozzle, a water suction port, a steam-water mixing nozzle, a pressure increasing diffuser, a check valve, a discharge port, a throat and etc.

To each of these steam injectors 21 are connected a check valve 22 for water supply, a check valve 23 for steam supply, a check valve 24 for overflow of steam, and a check valve 25 for discharge, and lines incorporated with these check valves 22 to 25 for the respective steam injectors 21 are parallely connected. Namely, for example, one check valve 22 for one steam injector 21 is incorporated in one line, i.e. a water supply line 44, and four lines each incorporated with one check valve 22 are parallelly connected. In the same manner, the check valves 23, 24 and 25 are respectively connected to corresponding steam supply line 45, drain line 41 and discharge line 43. When it is required to obtain a high discharge pressure, a pressure escape valve 26 having a pressure set to a value lower than a pressure of the supply water is connected to the downstream side of the overflow check valve 24 as occasion demands.

The steam injectors 21 each having the structure described above are parallely connected. In such arrangement, if one of them fails to start the operation or stops its operation, an actuator 27 connected to each of the steam injector 21 for driving the water nozzle is operated to again start the operation of the operation stopping steam injector 21 during the continuous operations of the other steam injectors 21. As the actuator 27, an electrically driven actuator, a pneumatically driven actuator or hydraulically driven actuator may be utilized. When each of the actuators 27 is actuated downwardly, the water nozzle is forced downward, thereby contacting the outside steam-water mixing nozzle 40 to shut out the annular steam flow, thus stopping the supplying of the steam. Under such condition, the one of the steam injectors 21 stops its operation. Therefore, the discharge pressure of this steam injector 21 vanishes and the discharge check valve 25 is closed to prevent the counterflows of the steam from the other steam injectors 21. During this operation, the water supply check valve 22 is automatically closed by the pressure difference so as not to cause the counterflow of the steam filling in the one of the steam injector 21, which operation now stops, into the other steam injectors 21. Furthermore, the steam supply check valve 23, which is arranged for the purpose of not condensing the steam by the counterflow of the water in the one of the steam injectors 21, which operation now stops, into the steam supply line and hence not causing water hammer phenomenon, is automatically closed by the pressure difference at a time when the water couterflow starts.

When the water nozzle driving actuator 27 is slowly moved upward for about 5 seconds, for example, the one of the steam injectors 21 which operation now stops is reactuated speedily. In the reactuation thereof, the overflow water is jetted from the overflow check valve 24 into the system including the pressurizing escape valve 26, so that it becomes necessary to arrange the drain line 41 and the drain tank 42. After the reactuation, the discharge pressure increases, and when this discharge pressure of the one of the steam injectors 21 increases more than those of the other steam injectors 21 now being operated, the closed discharge check valve 25 is again opened and this one of the steam injectors 21 attends to the operations of the other steam injectors 21, that is, all the steam injectors 21 of the system are operated.

When the discharge check valve 25 of the one of the steam injectors 21 is again opened, the discharge pressure is lowered till the pressure coincides with the drain pressure of the other steam injectors 21 in accordance with the QH curve calculated by the equation (1). Under this condition, since the flow rate passing the steam-water mixing nozzle 6 and the throat 10 of the steam injector 21 increases, the pressure at an overflow hole formed just before the pressure increasing diffuser 7 is lowered on the basis of the Bernoulli's theorem and the flow rate of the overflow water becomes substantially zero.

As described above, according to the steam injector system of this embodiment, even if the operation of one of the steam injectors 21 stops, the water supply check valve 22, the overflow check valve 24 and the discharge check valve 25 act for the entire operation or function of the system thereby to smoothly carry our the reactuation of this one of steam injectors 21 and to incorporate the same to the operation of the other steam injectors 21. On the contrary, as in the prior art in which the respective check valves 22 to 25 are not utilized and the inlet and outlet ports of the respective lines are merely parallelly connected, there cause the counterflows of the steam and the water and the mutual interference, thus not achieving such stable operational effects or functions as those achieved by the arrangement of the present embodiment.

FIG. 2 shows a concrete structure of the steam injector system of the characters described above as a perspective view. Referring to FIG. 2, a plurality, four in the view, of steam injectors 21 each is incorporated in a rectangular box shaped body 28, in which are also incorporated a water nozzle 39, a steam supply pipe 30, an overflow drain pipe 31, a discharge pipe 32 and a check valve inspection port 33 of the steam injectors 21. As the entire system, such rectangular box shaped bodies 28 are piled so that the respective steam injectors 21 are linearly piles, horizontally as viewed, thereby realizing the parallel arrangement thereof. It is of course to be noted that necessary numbers of steam injectors are piled so as to obtain a required capacity.

Figure 3:
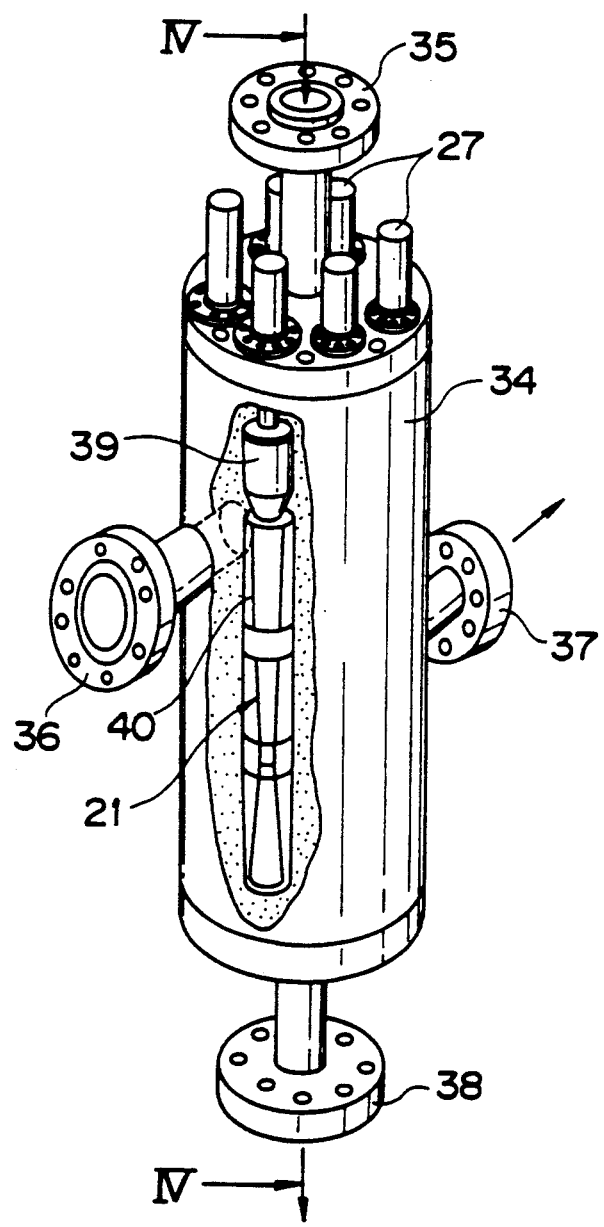
FIG. 3 is a perspective view, partially in section, of another embodiment of a steam injector system according to the present invention.

FIG. 3 represents a second embodiment according to the present invention, in which a plurality of steam injectors 21 each incorporated with the aforementioned check valves 22 to 25 are incorporated in a cylindrical body 34, to which are mounted a water supply flange 35, a steam supply flange 36, an overflow drain flange 37 and a discharge flange 38. According to this embodiment, the steam injector system may be handled and achieve the piping arrangement in its structure as one steam injector having a large capacity.

Figure 4:
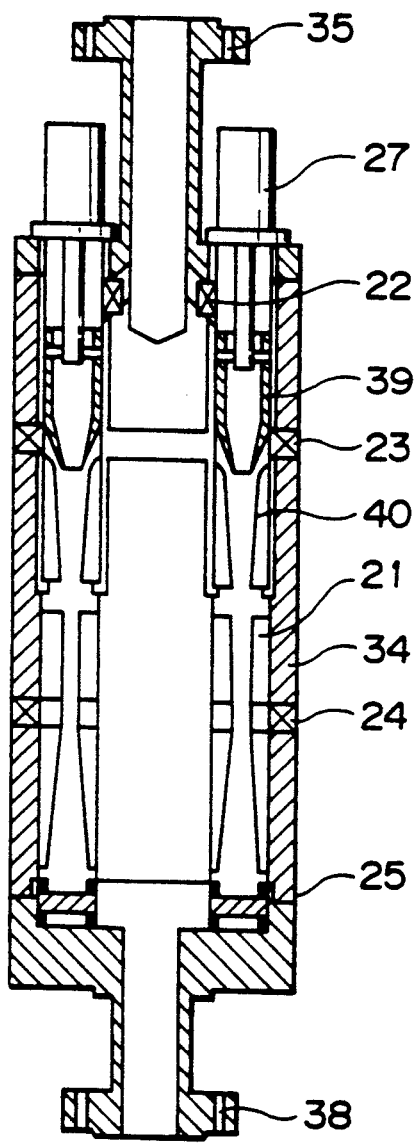
FIG. 4 shows an elevational section taken along the line IV—VI in FIG. 3.

FIG. 4 shows an elevational section of the steam injector system of FIG. 3, and as can be understood from this elevational section, six steam injectors 21 are circumferentially arranged in the cylindrical body 34 and the respective check valves 22 to 25 are parallelly connected. Accordingly, the operations and functions of this embodiment are substantially the same as those of the first embodiment shown in FIG. 2.

In another aspect, according to the present invention, there is further provided a steam injector system in which a plurality of steam injectors are connected in series, and one example of such series structure of the steam injector system will be described hereunder with reference to FIG. 5.

Figure 5:
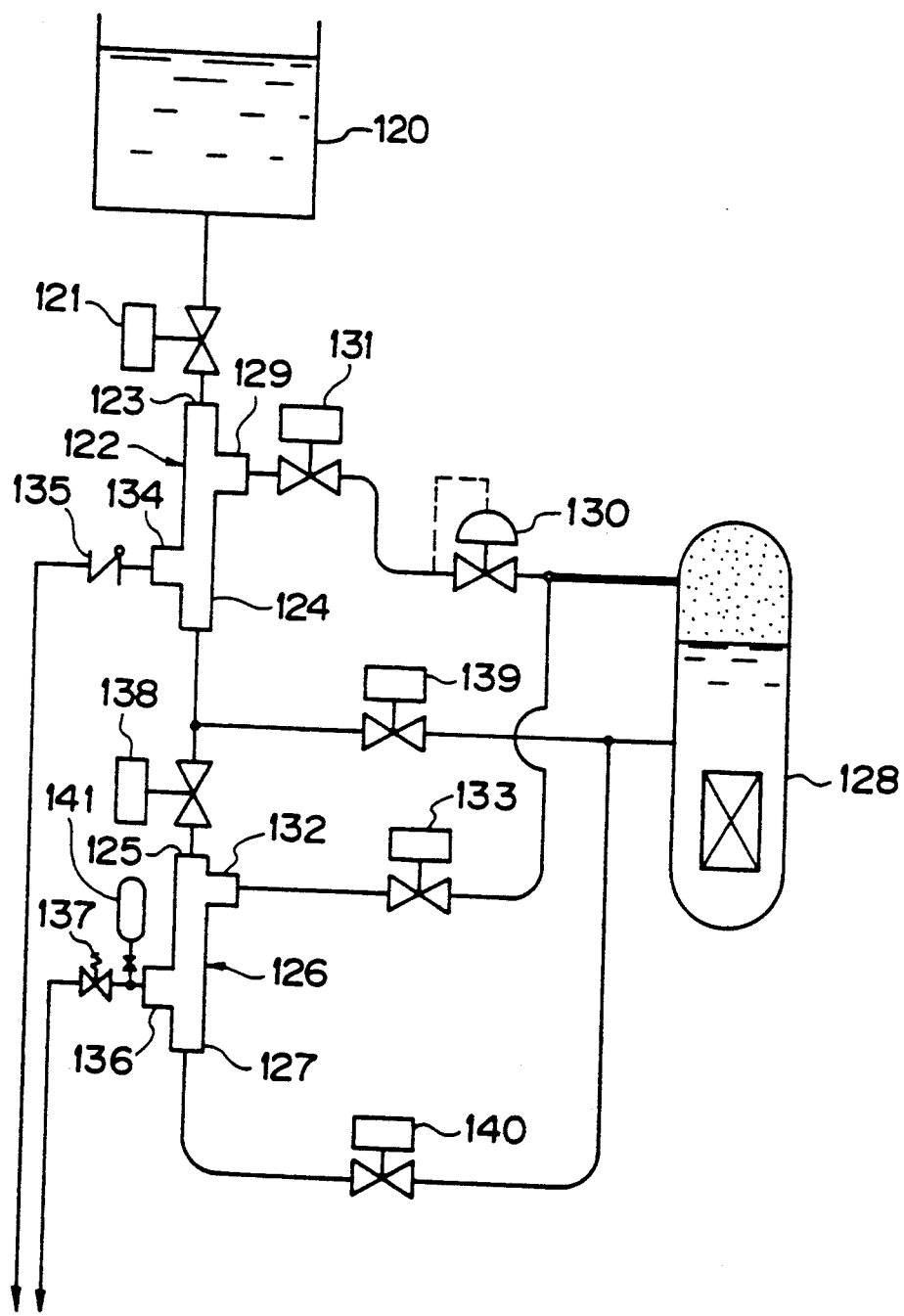
FIG. 5 is a system diagram representing a further embodiment of a steam injector system according to the present invention.

In a steam injector system of FIG. 5, a plurality, two in the illustration, of steam injectors are connected in series for increasing the draining pressure to make it possible to be utilized as an immergency cooling system of a reactor achieving the same objects as those described hereinbefore with reference to the parallel connection of the steam injectors.

Referring to FIG. 5, the steam injector system is provided with a water tank 120, which is connected to a water supply port 123 of a first stage steam injector 122 through a water supply valve 121, and a discharge port 124 of the first stage steam injector 122 is in series connected to a water supply port 125 of a second stage steam injector 126. The second stage steam injector 126 is also provided with a discharge port 127 at the downstream side thereof.

In this embodiment, a steam supply source is a reactor 128 and a pressure reducing valve 130 and a first stage steam supply valve 131 are incorporated in a line connecting the reactor 128 and a first stage steam supply port 129 of the first stage steam injector 122, and a second stage steam supply valve 133 is incorporated in a line connecting the reactor 128 and a second stage steam supply port 132 of the second steam injector 126.

The first and second steam injectors 122 and 126 are also provided with first and second overflow drain ports 134 and 136, respectively. A check valve 135 is located for the first overflow drain port 134 and a relief valve 137 is located for the second overflow drain port 136. In FIG. 5, a second stage water supply valve 138 is incorporated in a line connecting the first and second steam injectors 122 and 126, a first stage discharge valve 139 is incorporated in a line connecting the reactor 128 and the line connecting the first stage discharge port 124 and the second stage water supply port 132, and a second stage discharge valve 140 is incorporated in a line connecting the second stage discharge port 127 and the line connecting the reactor 128 and the first stage discharge valve 139.

In the steam injector system of the structure described above, the water accelerated in the first stage steam injector 122 is further accelerated in the second stage steam injector 126 for realizing high discharging pressure.

However, in the steam injector system of this structure, when the relief valve 137 is disposed at the second stage overflow drain port 136, the inner pressure of the second stage steam injector 126 is made instable, providing a significant problem as described hereinbefore.

For eliminating this defect, according to the present invention, as shown in FIG. 5, an accumulator 141 is connected to a line connecting the second stage overflow drain port 136 and the relief valve 137 for absorbing pulsations of the water caused at the time of operating the relief valve, as a pulsation absorbing device 141.

The operation of the steam injector system of this embodiment will be described hereunder.

The water in the water vessel 120 is supplied to the first stage steam injector 122 by opening the water supply valve 121. Under this state, when the steam from the reactor 128 is supplied into the first stage steam injector 122 via the pressure reduction valve 130 and the first stage steam supply valve 131, the first stage steam injector 122 is operated. The discharge water from the first stage steam injector 122 is then supplied into the second steam injector 138 connected in series to the first stage steam injector 122 through the second stage water supply valve 138. Under this state, when the steam from the reactor 128 is supplied into the second stage steam injector 126 via the second stage steam supply valve 133, the second stage steam injector 126 is operated, and the discharge water of high pressure is supplied to the reactor 128 by opening the second stage discharge valve 140.

Figure 6A:
FIGS. 6A and 6B are graphs showing pressure variations of fluids passing in the steam injector system in cases of locating no accumulator and locating an accumulator, respectively.
Figure 6B:
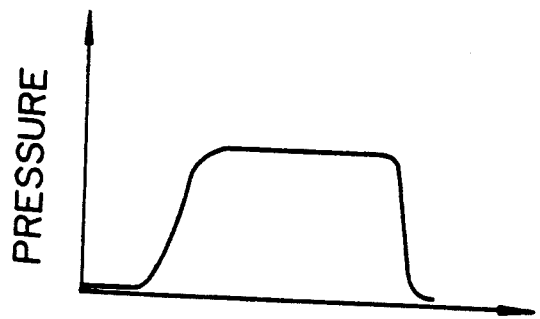

When the second stage discharge valve 140 is then closed, the fluid inside the second steam injector 126 is discharged outward through the relief valve 137. During this operation, the pressure change of the fluid caused in the inside of the second stage steam injector is shown in FIGS. 6A and 6B. Referring to FIG. 6A showing the state in which the accumulator 141 is not disposed as in the conventional art, it will be easily understood that when the relief valve 137 is operated, pulsation of the fluid inside the second stage steam injector 126 is caused. On the contrary, referring to FIG. 6B showing the state in which the accumulator 141 is disposed, the pulsation can be absorbed by this accumulator 141, thus the inner pressure of the fluid being stably settled, resulting in the stable operation of the second stage steam injector.

According to this embodiment, the inner pressure in the second stage steam injector 126 can be stably settled by the location of the accumulator 141 irrespective of the condition of the drain side of the second stage steam injector 126. Accordingly, the object of the present invention can be achieved by the steam injector system of this embodiment in which a plurality of steam injectors are connected in series in which an accumulating device is disposed at the discharge side of the last stage steam injector.

In modifications, another accumulator may be disposed at a portion of the first stage overflow discharge port 134, and devices having function of absorbing the pulsation may be disposed in place of the accumulator 141. It may of course be possible to connect further stage of steam injectors in series to the second stage steam injector as occasion demands.

In a further modification, the steam injector system of the first embodiment may be applied to the second embodiment. Namely, referring to FIG. 2, two steam injector systems each of the structure shown are substituted for the steam injectors 122 and 126 of the steam injector system of FIG. 5, respectively, and the steam injectors of FIG. 2 are connected in series. In this modification, a further increased drain pressure will be obtained.

In a further aspect of the present invention, the objects thereof can be achieved by providing embodiments of the steam injectors themselves having improved structures.

Figure 10:
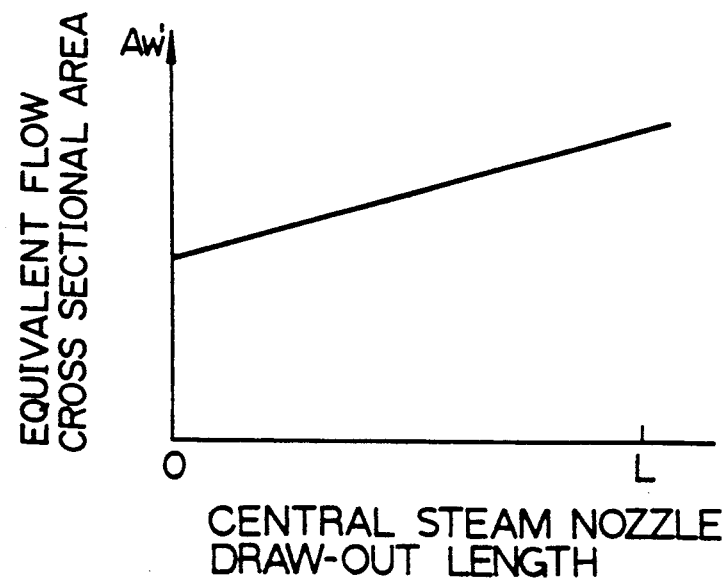
FIG. 10 is a graph showing a function of the steam injector of FIG. 7.
Figure 11:
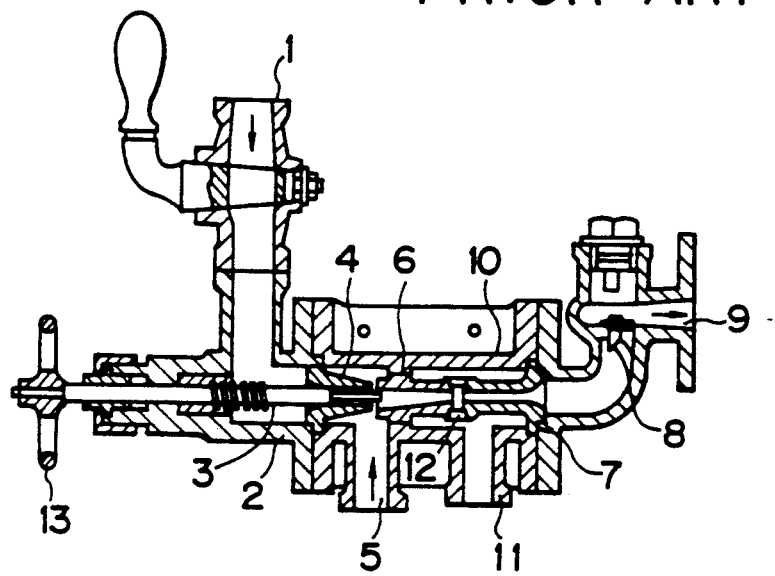
FIG. 11 is a longitudinal sectional view of one steam injector of conventional structure.

One preferred embodiment of the steam injector according to the present invention will be described hereunder with reference to FIGS. 7 and 10.

Figure 7:
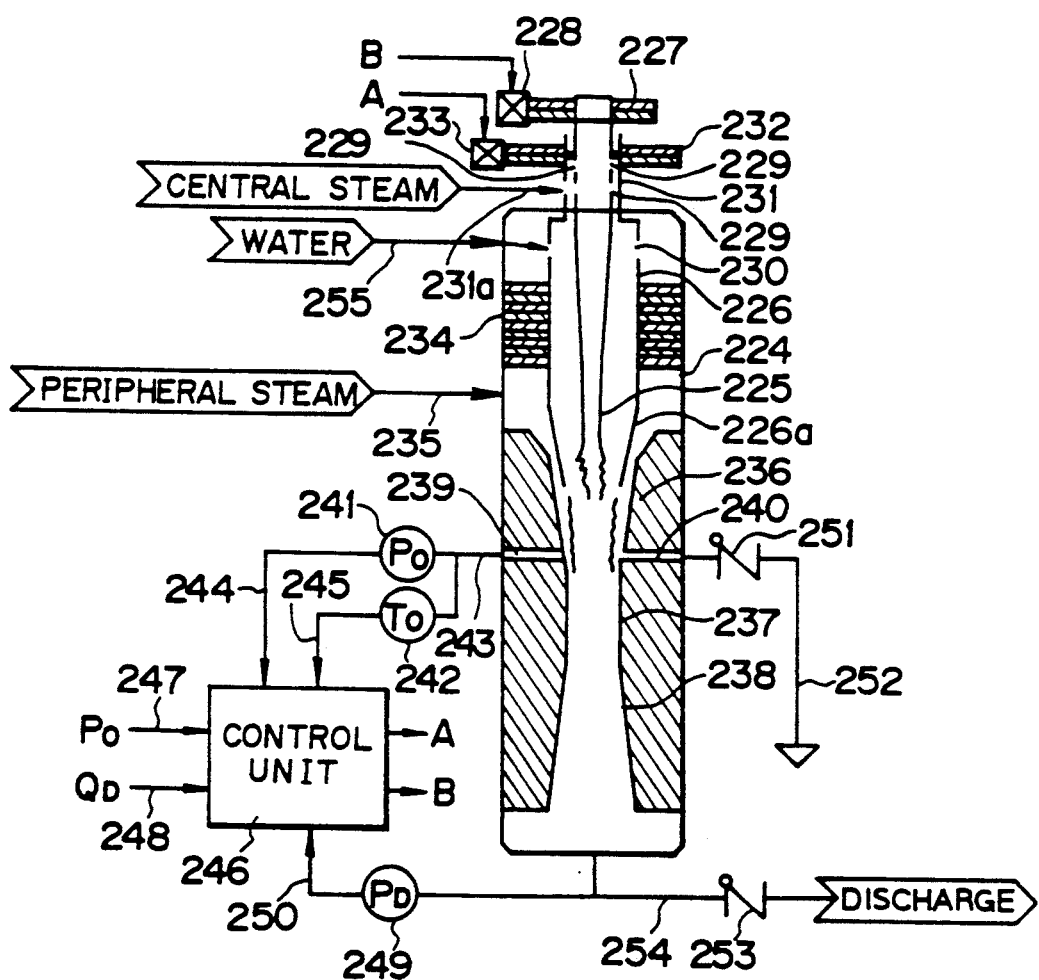
FIG. 7 shows a schematic view of a steam injector according to a still further embodiment of the present invention.

Referring to FIG. 7, a steam injector in a vertical arrangement comprises an outer cylindrical casing 224 and a central steam nozzle 225 and a hollow water nozzle driving shaft 226 are coaxially disposed at an inner upper portion of the casing 224. The front end portion of the driving shaft 226 is throttled as a water nozzle 226a.

The upper portion of the central steam nozzle 225 extends outward from the upper end of the casing 224. A central steam nozzle driving handle 227 is mounted to the extending end portion of the central steam nozzle 225, and an actuator 228 for driving the central steam nozzle 225 is mounted to the handle 227. A plurality of steam flow-in holes 229 are formed to the side portion of the extending upper portion of the central steam nozzle 225, through which the steam flows in inside the central steam nozzle 225. A water flow-in hole 230 is formed to the upper side portion of the water nozzle driving shaft 226. The shaft 226 has an upper end portion 231 of a cylindrical structure having a diameter smaller than that of the central portion of the shaft 226 and the cylindrical upper end portion 231 extends outward from the upper end of the casing 224. A water nozzle driving handle 232 is mounted to the extending end of the cylindrical end portion 231 of the shaft 226 and an actuator 233 for driving the water nozzle 226a.

A central steam supply pipe 231a is connected to an upper side portion of the cylindrical end portion 231 through which a central steam is supplied into the central steam nozzle 225 through the steam flow-in holes 229. A guide metal 234 is interposed between the inner wall surface of the casing 224 and the outer surface of the water nozzle driving shaft 226, and an outer peripheral steam supply pipe 235 is connected to the side wall of the casing 224 at a portion below the guide metal 234. A steam-water mixing nozzle 236 is further mounted to the inner wall surface of the casing 224 at a portion below the connection of the outer peripheral steam supply pipe 235 so as to surround the water nozzle 226a. A throat 237 is secured to the lower end of the steam-water mixing nozzle 236 and a pressure increasing diffuser 238 is also secured to the lower end of the throat 237.

Overflow ports 239 and 240 are formed to the lower portions of the steam-water mixing nozzle 236, and to one overflow port 239 are connected an overflow pressure sensor 241 and an overflow temperature sensor 242 through a signal line or conductor 243. The output sides of the overflow pressure and temperature sensors 241 and 242 are connected to a control unit 246 through signal lines or conductors 244 and 245, respectively. To the control unit 246 are connected a $P_o$ setting signal line 247, a $Q_D$ setting signal line 248 and a signal line 250 for a discharge sensor ($P_D$) 249.

An overflow drain pipe 252 is connected to the other overflow port 240 through an overflow check valve 251. A discharge pipe 254 is connected to the lower end of the casing 224 and a drain side check valve 253 is incorporated to the discharge pipe 254.

A water supply pipe 255 is connected to the upper side portion of the casing 224, through which the water flows inside the water nozzle 226a through the water flow-in hole 230.

Figure 8:
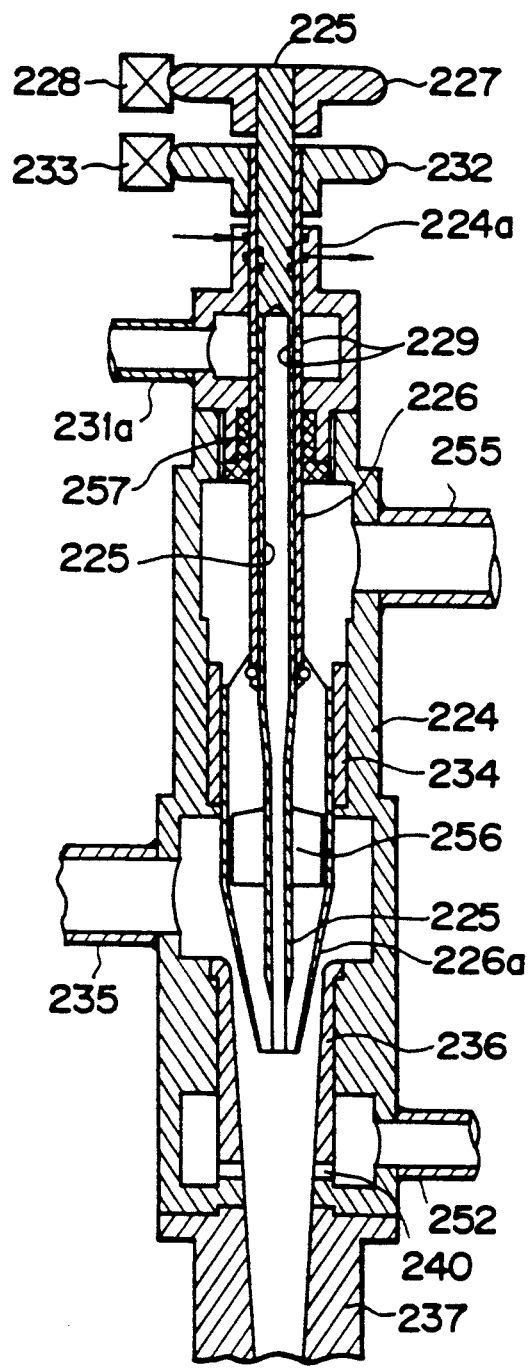
FIG. 8 is an enlarged elevational section of a portion of the steam injector of FIG. 7.

FIG. 8 is a detailed sectional view, in an enlarged scale, of the main portion of the steam injector shown in FIG. 7, in which like reference numerals are added to portions or members corresponding to those shown in FIG. 7.

The central steam is supplied into the central steam nozzle 225 through the steam flow-in holes 229 formed to the side portions of both the water nozzle driving shaft 226 and the central steam nozzle 225. In order to prevent the temperature increasing of both the water nozzle driving shaft 226 and steam nozzle driving shaft 225a, cooling water is supplied into a shaft seal casing 224a disposed at an upper portion of the casing 224. The water nozzle 226a is guided by the guide metal 234 so as not to become eccentric. A steam nozzle guide vane 256 is interposed with space between the outer surface of the central steam nozzle 225 and the inner surface of the water nozzle 226a so that the central steam nozzle 225 can be prevented from generating an eccentric steam flow or fluid vibration which may be caused by the high velocity water flow in the water nozzle 226a. The water nozzle 226a is directed in the axial direction by means of a driving screw 257.

In the described embodiment, the annular outer peripheral steam flow is formed between the outer periphery of the water nozzle 226a and the inner periphery of the steam-water mixing nozzle 236. The water is supplied to the water nozzle 226a through the water supply pipe 255 and the steam is supplied to the steam-water mixing nozzle 236 through the outer peripheral steam supply pipe 235. It is not necessary to control the pressure of the central steam and the pressure of the outer peripheral steam to be equal and the values of these pressures can be optionally selected in accordance with the operating conditions.

The pressure increasing diffuser 238 operates to reduce the flow velocity of the high velocity water flow thereby to increase the pressure and obtain the high discharge pressure on the basis of the Bernoull's theorem. Accordingly, the discharge side check valve is opened to supply the discharge water to the reactor. When the steam injector comes into a normal operation and the high velocity water flow passes the throat, the pressure is lowered on the basis of the Bernoull's theorem, whereby the overflow check valve is closed and the overflow towards the overflow drain pipe 252 stops.

The handles 232 and 227 respectively for driving the water nozzle 236a and the central steam nozzle 225 are driven by the actuators 233 and 228. As these actuators, manual devices, electric motors, pneumatically actuating piston means, or hydraulically actuating means may be utilized. When the actuator 233 for driving the water nozzle 226a to move upwardly the water nozzle 226a, the water nozzle 226a comes into contact to the outside steam-water nozzle 236 to thereby make narrow the annular steam flow passage and hence reduce the supply amount of the steam, thus lowering the discharge pressure $P_D$. On the contrary, when the actuator 228 for driving the steam nozzle 228 and the central steam nozzle 225 is drawn out, the flow pass cross sectional area of the water at the front end portion of the water nozzle 225 is increased and the discharge amount $Q_D$ is hence increased.

According to this characteristic feature, the operating condition of the steam injector can be controlled to be always optimumly by the control unit 246 including microcomputing means. To the control unit 246 are inputted electric signals from the overflow pressure sensor 241 for measuring the overflow pressure $P_o$, the overflow temperature sensor 242 for measuring the overflow water temperature, and the discharge pressure sensor 249 for measuring the discharge pressure $P_D$ by utilizing a filter mechanism for attenuating the pressure pulsation, and from the control unit 246 are outputted signals A and B for driving the water nozzle 226a and the central steam nozzle 225, respectively, in response to the signals for setting the discharge pressure $P_D$ and the discharge flow amount $Q_D$.

Figure 9:
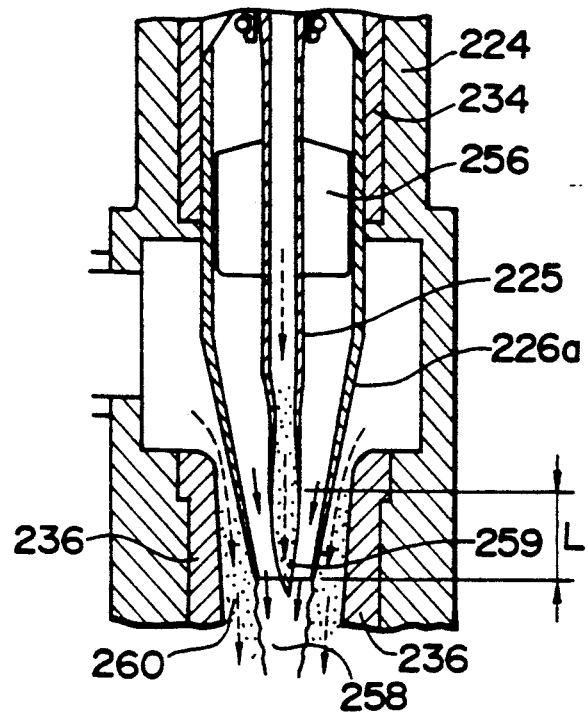
FIG. 9 shows a portion of the steam injector of FIG. 8, showing a state in which a central steam nozzle is somewhat drawn upward.

FIG. 9 is a partial sectional view showing a state in which the central steam nozzle 225 is drawn out upwardly by a distance L from the state shown in FIG. 8. As can be seen from FIG. 9, water jet 258 can be accelerated with high efficiency by central steam jet 259 and outer peripheral steam jet 260 without contacting the inner wall of the steam-water mixing nozzle 236. As shown in FIG. 10, an equivalent flow sectional area Aw' at the outlet portion is gradually increased by the gradual draw-out of the central steam nozzle 225, thus increasing the water supply amount.

In summary, according to this embodiment, the steam is jetted at the outer periperal portion and the central portion of the water jet by driving a large amount of waters. The central steam nozzle is disposed inside the hollow water nozzle driving shaft, and the outer peripheral steam nozzle is arranged to the outer peripheral portion of the water nozzle. The driving means for moving the steam nozzle to the axial direction and means for measuring the water supply amount and discharge flow amount are disposed so that the flow sectional area at the front end portion of the water nozzle is made variable in response to the discharge flow rate. The steam flow sectional area can be optimumly controlled to be variable in response to the steam pressure and the required discharge flow rate by locating the sensors for measuring the discharge pressure and the overflow water temperature, the control unit for attenuating the pulsation of the discharge pressure and the driving mechanism for moving the water nozzle in the axial direction.

Furthermore, in a preferred embodiment, the steam injectors of the above embodiments may be applied to the steam injector systems of FIG. 1 and FIG. 5 for further improving the purpose of the initial object of the present invention.

As described hereinbefore, according to the present invention, the initial objects can be effectively achieved by providing steam injector systems in which a plurality of steam injectors are connected parallelly or in series, and by providing a steam injector of the improved structure.

What is claimed is:

1. A steam injector system comprising:
a plurality of steam injectors arranged in parallel with each other, each of said steam injectors being provided with a check valve adapted for water supply, a check valve adapted for steam supply, a check valve adapted for overflow and a check valve adapted for discharge; and
a plurality of lines each connecting respective check valves in parallel with each other, said lines including a first line for connecting respective water supply check valves in parallel with each other, a second line connecting respective steam supply check valves in parallel with each other, a third line for connecting respective overflow check valves in parallel with each other, and a fourth line connecting respective discharge check valves in parallel with each other.

2. A steam injector system according to claim 1, wherein a water supply pipe, a steam supply pipe, an overflow drain pipe and a discharge pipe are commonly arranged for the respective steam injectors.

3. A steam injector system according to claim 1, wherein each of said steam injector is accommodated in a rectangular box-shaped casing and a plurality of rectangular box-shaped casings each thus formed are arranged linearly so as to accomplish a parallel arrangement of the respective steam injectors.

4. Steam injector system according to claim 1, wherein a plurality of steam injectors are accommodated in a cylindrical casing circumferentially parallelly therein and the respective check valves disposed in the respective steam injectors are parallelly connected with each other in accordance with kinds of the check valves.

5. A steam injector system according to claim 1 wherein each of the steam injectors comprises:
an outer casing;
a water nozzle means disposed in the casing so as to extend axially therein;
a water supply means disposed for supplying water to the water nozzle means;
a first steam nozzle means disposed inside the water nozzle means coaxially therewith;
a steam supply means disposed for supplying steam to the first steam nozzle means;
a steam-water mixing nozzle means disposed on a downstream side of the water nozzle means and the first steam nozzle means for mixing water and steam after passing the water nozzle means and the first steam nozzle means;
a second steam nozzle means mounted to the casing at a portion adapted to supply steam from an outside into the steam-water mixing nozzle;
a diffuser means disposed on a downstream side of the steam-water mixing nozzle for increasing a pressure of steam-water mixture; and
a discharge means disposed on a downstream side of the diffuser means.

6. A seam injector system according to claim 5, wherein the system further includes a driving means for axially moving the first steam nozzle means so that a flow sectional area at a front end portion of the water nozzle means is made variable in response to the discharge flow rate.

7. A steam injector system comprising:
a plurality of first to last stage steam injectors arranged in series with each other each including a water supply port, a steam supply port, an overflow drain port and a discharge port, said last stage steam injector being provided with a relief valve disposed at a last stage overflow drain port;
a plurality of lines each connecting in series a discharge port of a preceding stage steam injector with a water supply port of a following stage steam injector; and
means at least disposed between the last stage overflow drain valve and the relief valve and adapted for absorbing pulsation of pressure of fluid passing the last stage steam injector caused at an operation time of the relief valve.

8. A steam injector according to claim 7, wherein said means is an accumulator.

9. A steam injector system according to claim 7, wherein each of the injectors comprises:
an outer casing;
a water nozzle means disposed in the casing so as to extend axially therein;
a water supply means disposed for supplying water to the water nozzle means;
a first steam nozzle means disposed inside the water nozzle means coaxially therewith;
a steam supply means disposed for supplying steam to the first steam nozzle means;
a steam-water mixing nozzle means disposed on a downstream side of the water nozzle means and the first steam nozzle means for mixing water and steam after passing the water nozzle means and the first steam nozzle means;
a second steam nozzle means mounted to the casing at a portion adapted to supply steam from an outside into the steam-water mixing nozzle;
a diffuser means disposed on a downstream side of the steam-water mixing nozzle for increasing a pressure of steam-water mixture; and a discharge means disposed on a downstream side of the diffuser means.

10. A seam injector system according to claim 9, wherein the system further includes a driving means for axially moving the first steam nozzle means so that a flow sectional area at a front end portion of the water nozzle means is made variable in response to the discharge flow rate.

11. A steam injector comprising:
an outer casing;
a water nozzle means disposed in the casing so as to extend axially therein, with water nozzle moving means for axially moving the water nozzle means;
a water supply means disposed for supplying water to the water nozzle means;
a first steam nozzle means disposed inside the water nozzle means coaxially therewith, and first steam nozzle moving means for axially moving the first steam nozzle manes;
a steam supply means disposed for supplying steam to the first steam nozzle means;
a steam-water mixing nozzle means disposed on a downstream side of the water nozzle means and the first steam nozzle means for mixing water and team after passing the water nozzle means and the first steam nozzle means;
a second steam nozzle means mounted to the casing at a portion adapted to supply steam from an outside into the steam-water mixing nozzle;
a diffuser means disposed on a downstream side of the steam-water mixing nozzle for increasing a pressure of steam-water mixture; and
a discharge means disposed on a downstream side of the diffuser means.

12. A seam injector according to claim 11, wherein the injector further includes a driving means for axially moving the first steam nozzle means so that a flow sectional area at a front end portion of the water nozzle means is made variable in response to the discharge flow rate.

13. A steam injector according to claim 11, wherein said first steam nozzle means has a portion extending outward the outer casing and a first steam nozzle means driving means is mounted to the outward extending portion of the first steam nozzle means to axially drive the first steam nozzle means.

14. A steam injector comprising:
an outer casing;
a water nozzle means disposed in the casing so as to extend axially therein;
a water supply means disposed for supplying water to the water nozzle means;
a first steam nozzle means disposed inside the water nozzle means coaxially therewith;
a steam supply means disposed for supplying steam to the first steam nozzle means;
a steam-water mixing nozzle means disposed on a downstream side of the water nozzle means and the first steam nozzle means for mixing water and steam after passing the water nozzle means and the first steam nozzle means;
a second steam nozzle means mounted to the casing at a portion adapted to supply steam from an outside into the steam-water mixing nozzle;
a diffuser means disposed on a downstream side of the steam-water mixing nozzle for increasing a pressure of steam-water mixture; and
a discharge means disposed on a downstream side of the diffuser means;
wherein an overflow port is formed to the casing at portions below the location of the steam-water mixing nozzle means and wherein an overflow pressure sensor and an overflow temperature sensor are operatively connected to the overflow port, said overflow pressure sensor and said overflow temperature sensor being electrically connected to a control unit.

* * * * *